United States Patent [19]
Kohn et al.

[11] 4,428,993
[45] Jan. 31, 1984

[54] STRUCTURAL LAMINATE WITH EXPANDED WOOD CORE

[75] Inventors: Henri A. Kohn, Northvale, N.J.; Hugo Spahn, Wappingers Falls, N.Y.

[73] Assignee: Baltek Corporation, Northvale, N.J.

[21] Appl. No.: 377,037

[22] Filed: May 11, 1982

[51] Int. Cl.³ .............................................. B32B 3/12
[52] U.S. Cl. .................................... 428/117; 52/800; 52/807; 428/464
[58] Field of Search ............... 428/116, 118, 117, 73, 428/464; 52/800, 807

[56] References Cited

U.S. PATENT DOCUMENTS

| | | | |
|---|---|---|---|
| 2,644,777 | 7/1953 | Havens | 428/116 |
| 3,249,659 | 5/1966 | Voelker | 428/117 X |
| 3,755,038 | 8/1973 | Atteck | 428/116 X |
| 3,950,202 | 4/1976 | Hodges | 428/116 X |
| 4,284,443 | 8/1981 | Hilton | 428/116 X |
| 4,343,846 | 8/1982 | Kohn | 428/116 X |

FOREIGN PATENT DOCUMENTS 1108073  8/1955  France .................................. 428/116

*Primary Examiner*—Henry F. Epstein
*Attorney, Agent, or Firm*—Michael Ebert

[57] ABSTRACT

A structural sandwich laminate constituted by thin skins, such as aluminum or fiber-reinforced plastic sheets bonded to the faces of a core formed by an array of wood strips having a periodic wave formation. The wavy strips in the array are out of phase with each other and are bonded together at their contiguous troughs and peaks to define an open-celled expanded wood structure whereby the laminate, though light-weight, has high strength.

7 Claims, 11 Drawing Figures

STRUCTURAL LAMINATE WITH EXPANDED WOOD CORE

BACKGROUND OF THE INVENTION

This invention relates generally to structural sandwich laminates in which a core has facing skins bonded thereto, and in particular to a laminate whose core is formed by an expanded wood structure to provide a light-weight laminate of high strength.

An expanded metal sheet is formed by slitting a sheet of metal and then stretching the sheet into a lattice. The term expanded plastic is applicable to a cellular plastic structure created by introducing gas into the molten plastic. As used herein, the term expanded wood refers to a cellular structure formed by an array of wood strips having a periodic wave formation, the wavy strips being out of phase with each other and being joined together to define open-ended cells.

While the invention has particular advantages in the context of end grain balsa wood, it is also applicable to other forms of wood fabricated to create an expanded wood structure.

Balsa has outstanding properties unique in the field of lumber, for on the average it weighs less than nine pounds per cubic foot, this being 40% less than the lightest North American species. Its cell structure affords a combination of high rigidity and compressive and tensile strength that is superior to any composite or synthetic material of equal or higher density. Balsa is dimensionally stable and may be processed by standard woodworking techniques.

It is known that end grain balsa wood is capable of supporting far greater loads than flat-grain material of the same density and that low-density balsa in the end-grain direction will support greater loads than flat grained material of higher density. The cellular structure of balsa is such that the number of cells per cubic foot is extremely high, the wall thickness of each cell being quite thin. The cells are effectively independent of each other, each cell being comparable to an independent column or fiber. The fibers are substantially parallel to each other.

Structural sandwich laminates can be created by bonding thin facings or skins to balsa wood panels which function as a core. Thus the Kohn et al. U.S. Pat. No. 3,325,037 and the Lippay U.S. Pat. No. 3,298,892 disclose structural sandwich laminates whose core is formed of end-grain balsa, the resultant laminates having a remarkably high strength-to-weight ratio as well as excellent thermal insulation properties.

End-grain balsa-core sandwich laminates are widely used in transportation and handling equipment, such as for floors of railroad cars, shipping containers, cargo pallets, bulkheads, doors and reefer bodies, as well as in a variety of other applications. These laminates are also employed for structural insulation in aircraft applications, in housing and in boating.

There are certain applications where the weight of existing types of laminates having a solid balsa core still exceeds optimal requirements despite the fact that balsa is inherently light weight. Thus in aircraft flooring or in radar domes constructed of balsa-wood sandwich laminates, it is desirable that the weight of the laminate be reduced without materially impairing the strength of the laminate.

An alternative core material for a laminate which affords reduced weight is a paper honeycomb constituted by an array of open cells having a square or other geometric configuration. A honeycomb of this type is extremely light but its structural properties are much inferior to those of a balsa core. Moreover since the facing skins must be laminated to the thin paper edges of the honeycomb, the bonding area is insufficient. To provide a strong and stiff sandwich structure, still another alternative lies in the use of a foam plastic core for a sandwhich laminate, but while such cores are very light in weight they possess relatively weak structural properties.

In the copending application Ser. No. 148,690 filed May 12, 1980 entitled Balsa-Core Sandwich Laminate, the entire disclosure of which is incorporated herein by reference, the core of a structural sandwich laminate is formed by a solid panel of end-grain balsa wood having holes punched therein to define a reticulated core of high strength and exceptionally light-weight.

While punching holes in a balsa panel results in some loss of strength, this loss is not proportional to the amount of wood removed therefrom. Thus, as pointed out in the copending application, one can by punching holes therein reduce the weight of an end-grain balsa core by 30 percent, yet retain 80% of its strength as compared to an unpunched panel. However, the material removed by punching is entirely wasted, and because Balsa is relatively expensive, this represents a significant economic loss.

SUMMARY OF THE INVENTION

In view of the foregoing, the main object of this invention is to provide a structural sandwich laminate which includes a core of expanded wood so that the laminate is exceptionally light-weight, yet of high structural strength.

More specifically an object of this invention is to provide a technique for producing an expanded balsa wood core formed by an array of end grain balsa strips having a periodic wave or corrugated formation, which strips are joined together to create a cellular core.

A significant advantage of an expanded wood core is that the walls thereof are relatively thick as compared to a typical paper or plastic honeycomb core; hence a much larger bonding surface is available onto which the skins of the laminate are glued, thereby ensuring a better bond and a stronger and stiffer sandwich structure.

Also an object of the invention is to provide an expanded balsa wood core formed by wave strips in a manner avoiding waste of material, for the strips are derived by slicing a solid wood panel into strips with virtually no loss of wood. Thus a solid wood panel of given dimensions, when expanded in the manner of the invention, yields a cellular panel of much larger dimensions.

A salient feature of the invention is that an expanded end-grain balsa wood core of given dimensions possesses structural properties almost as good as those of a solid end-grain panel of the same dimensions, yet is much lighter in weight.

These objects are accomplished in a structural sandwich laminate constituted by thin skins, such as aluminum or fiber-reinforced plastic or wood sheets bonded to the faces of a core formed by an array of wood strips having a periodic wave formation. The wavy strips in the array are out of phase with each other and are bonded together at their contiguous troughs and peaks to define an open-celled expanded wood structure whereby the laminate, though light-weight, has high strength.

BRIEF DESCRIPTION OF THE DRAWINGS

For a better understanding of the invention as well as other objects and further features thereof, reference is made to the following detailed description to be read in conjunction with the accompanying drawings, wherein.

DESCRIPTION OF INVENTION

Figure 1:
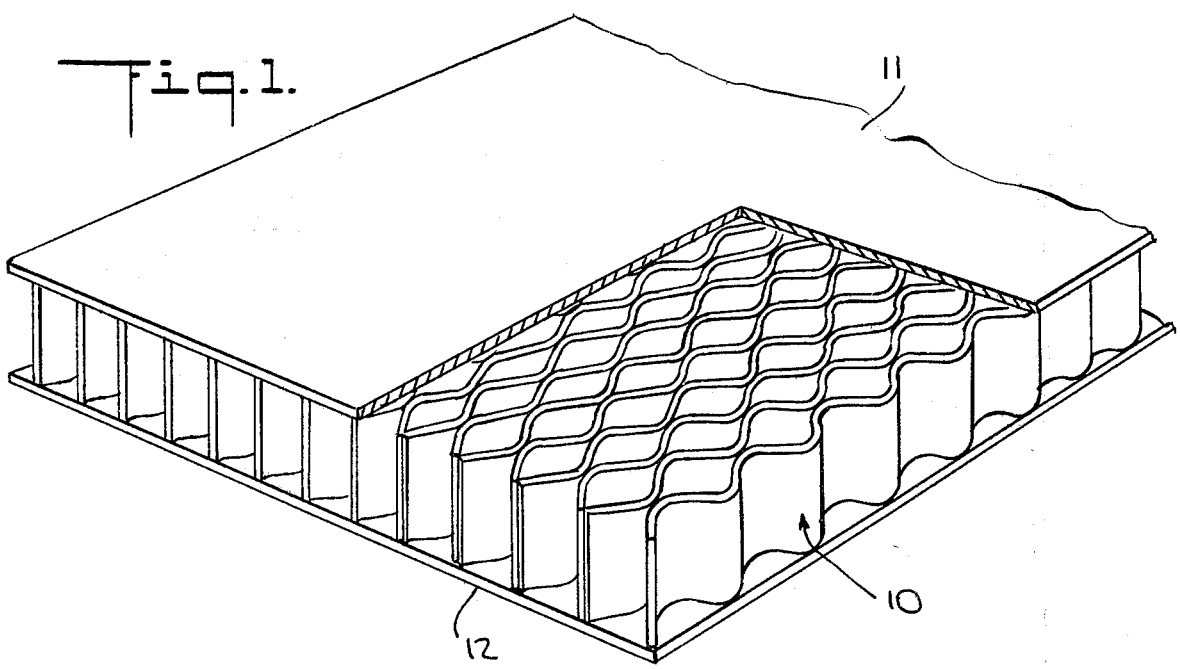
FIG. 1 is a perspective view of a structural sandwich laminate having an expanded wood core in accordance with the invention.

The Laminate:

Referring now to the drawings and more particularly to FIG. 1 there is shown a structural laminate in accordance with the invention, the laminate consisting of an expanded balsa wood core 10 to whose opposing faces are laminated skins 11 and 12, which in practice may be constituted by aluminum, fiber-reinforced plastic or wood sheeting.

The nature of the facing skins depends on the application for which the laminate is intended. Thus the facings may be made of a metal, wood or synthetic plastic material having properties appropriate to the temperatures and other conditions involved in the application. In a structural laminate of this type, it is important that the mechanical properties of the facings in tension or compression in direction perpendicular to the grain of the balsa be superior to the mechanical properties of balsa in tension or compression across the grain.

Figure 2:
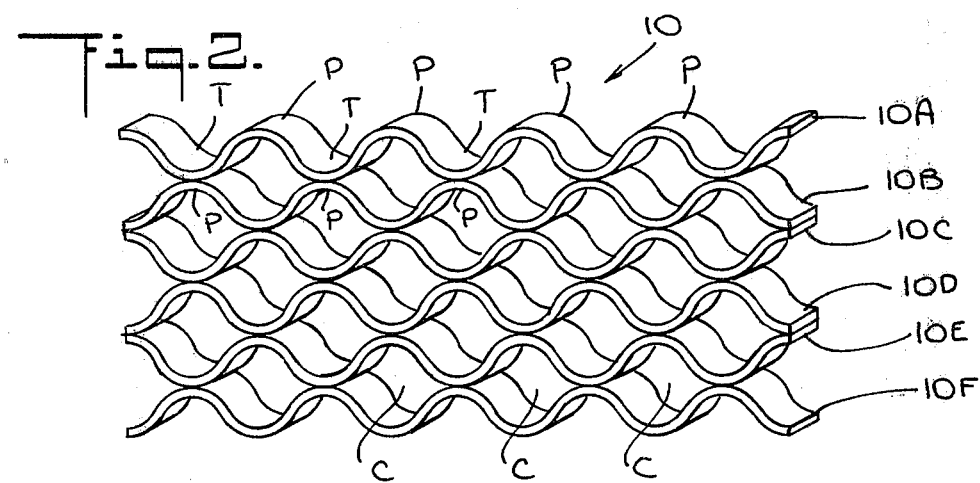
FIG. 2 shows an array of wavy strips bonded together to produce an expanded wood core.

Expanded core 10 is composed, as shown in FIG. 2, of an array of like end-grain balsa wood strips 10A, 10B, 10C, 10D, etc., each having a periodic wave formation which in the example illustrated is sinusoidal. Each wavy strip is composed of alternate peaks P and troughs T. The wavy strips are arranged so that they are out of phase with each other, as a result of which the troughs T of one strip are contiguous with the peaks of the adjacent strip and are glued together at these points to create open-ended cells C having an eye-shaped cross section. The invention is not limited to sinusoidal shapes, and in practice the shape of the strip may approach that of a semi-hexagon so that when the strips are joined together the cells have a hexagonal cross section. It will be seen that the steps are moderately thick; hence the edges thereof afford an adequate area for receiving adhesive to strongly bond the edges to the facing skins.

In aircraft or other applications requiring lightweight laminates, aluminum is the preferred material for the skins to be bonded to a balsa wood core; for the inherent lightness of aluminum metal and that of a reticulated balsa core panel results in a laminate of exceptional light weight.

Figure 3:
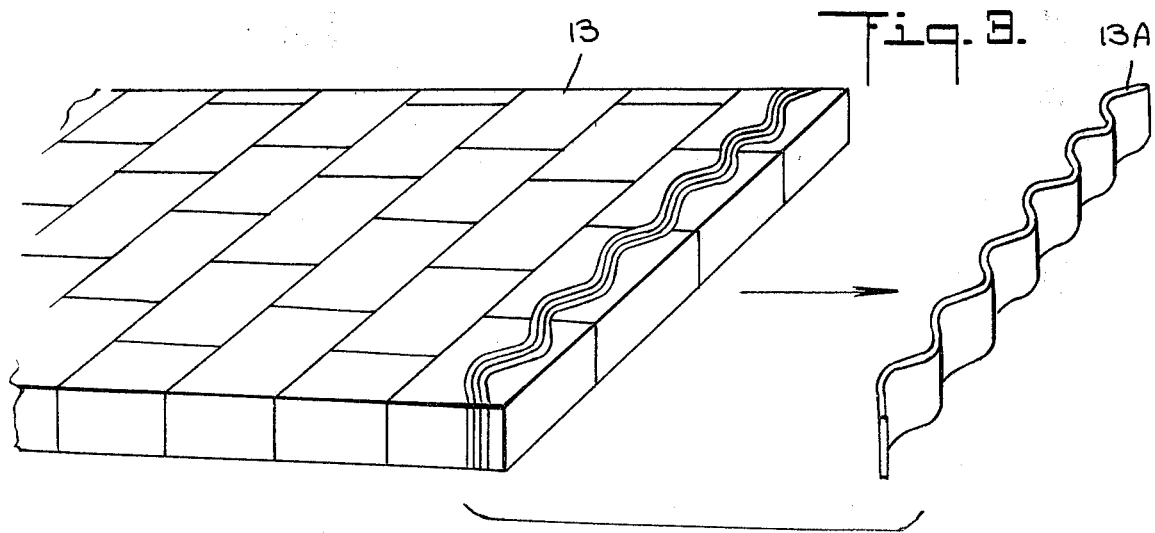
FIG. 3 shows how a panel of balsa wood is cut into strips having a periodic wave formation.

Production of Wavy Strips:

Referring now to FIG. 3, there is shown one preferred technique for producing the required wavy strips of balsa wood. To this end, the basic stock is a panel 13 of solid end-grain balsa wood having a width equal to the desired length of the strips and a thickness equal to the desired height of the strips. Panel 13 may be composed, as shown, of joined-together blocks. The panel is sliced into individual wavy strips such as 13A by a sawing action by means of a thin blade contour bandsaw or a jigsaw, using standard woodworking machinery for this purpose.

Figure 4:
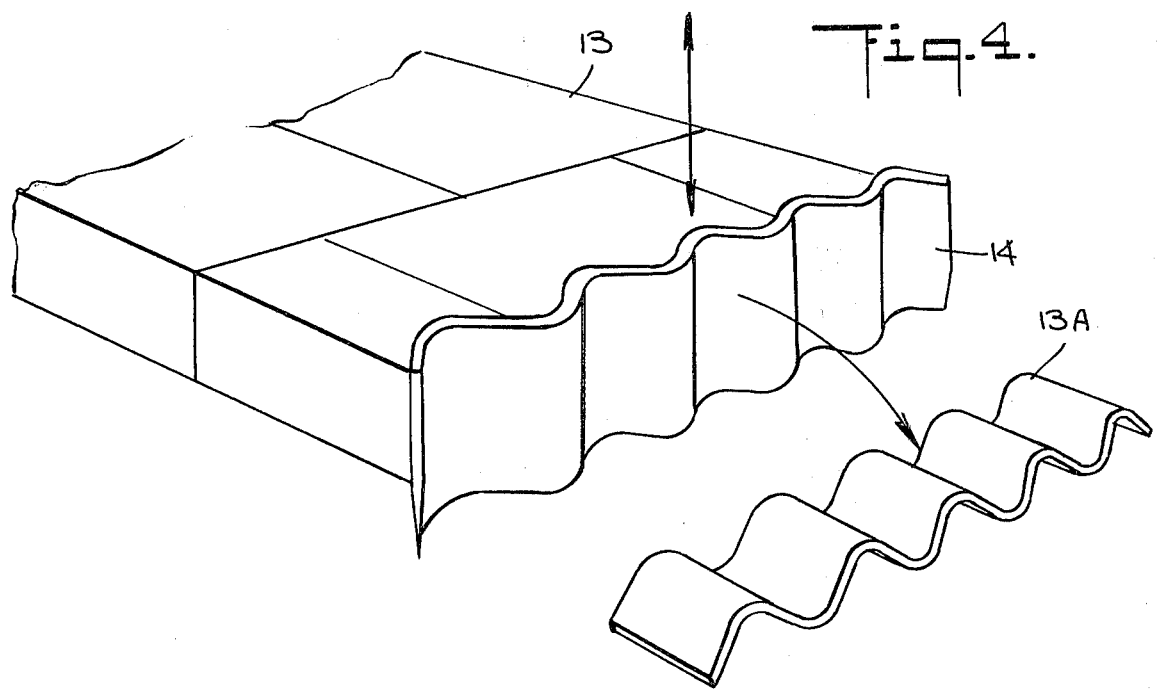
FIG. 4 illustrates a reciprocating knife technique for producing the wave-form strips.
Figure 5:
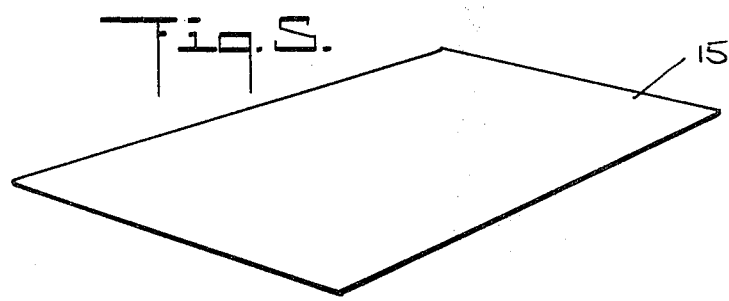
FIGS. 5 to 11 illustrate the technique for producing wavy strips in other wood species

A tool such as a bandsaw inevitably removes some material in effecting a cutting action and this results in waste which in turn adds to the cost of the product. A preferred method of cutting a balsa wood panel into wavy strips is shown in FIG. 4 where in this instance use is made of a die 14 having the desired periodic wave formation. Die 14 is reciprocated with respect to the solid panel by means of a reciprocating press in which the panel is indexed in incremental steps to produce the strips. The incremental-advance mechanism preferably includes a variable index so that the thickness of the strips can be modified to satisfy structural requirements.

Because end-grain balsa has a cellular structure in which the fibers are substantially parallel to each other and lie at right angles to the faces of the panel, the reciprocating die acts to cleanly split the wood parallel to the grain and almost no waste results from the operation. Thus the wavy strip is effectively comprised of parallel columns or fibers whose ends are bonded to the facing skins to provide a high strength laminate highly resistant to compression.

Figure 6:
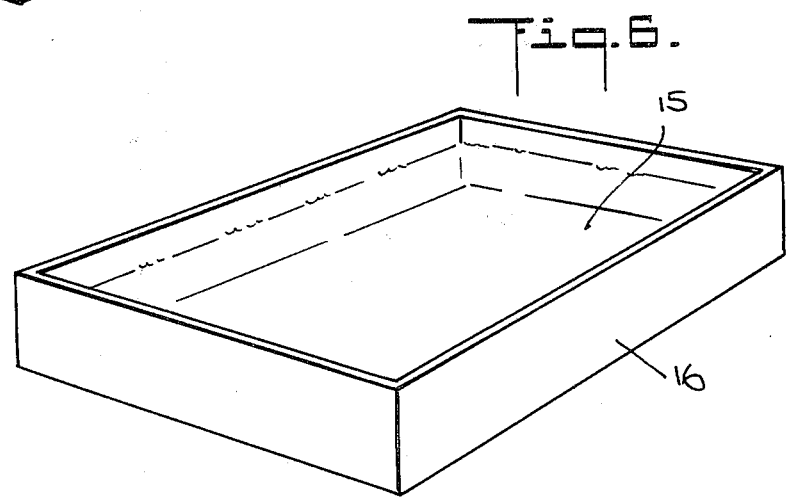
Figure 7:
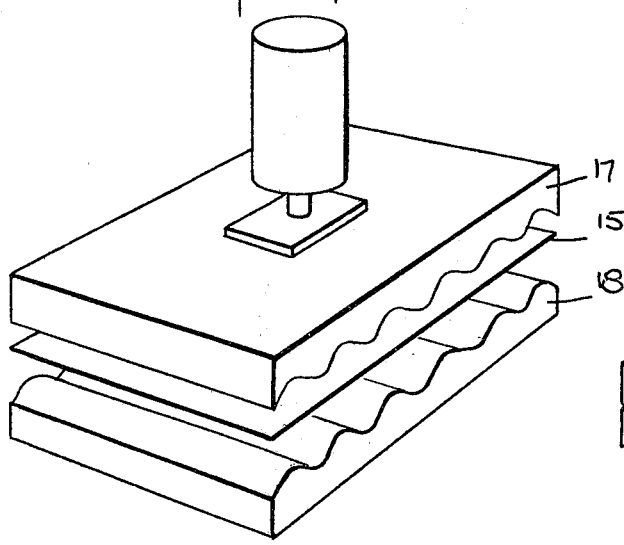
Figure 8:
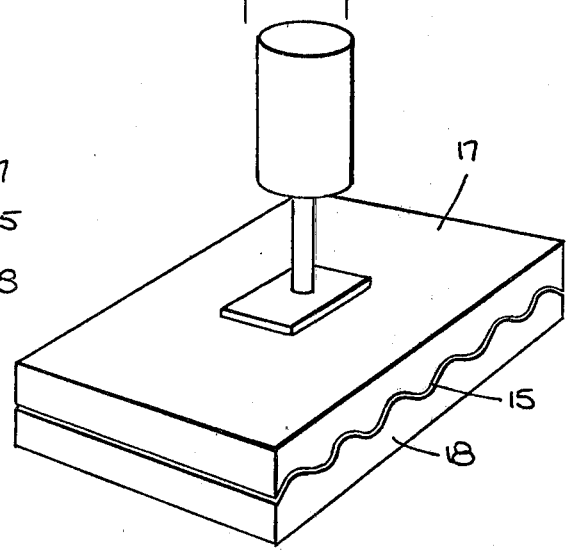
Figure 9:
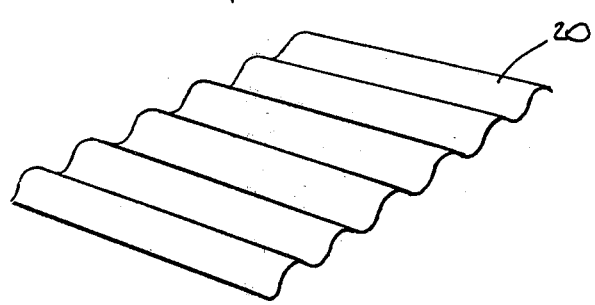

In the case of other wood species, the techinque for producing wavy strips thereof is illustrated in FIGS. 5 to 11. The feedstock in this instance is flat grain veneer 15 of the wood. To render the wood bendable, the veneer 15 is soaked in a bath of hot water 16 or other plasticizing medium, as shown in FIG. 6. The softened wood veneer is then placed, as shown in FIG. 7, between upper and lower platens 17 and 18 having complementary wave formations. The platens are heated electrically or by other means so that when the veneer is compressed therebetween, as shown in FIG. 8, and held under pressure for a limited period, the veneer, upon drying, assumes a corrugated form 20 shown in FIG. 9.

Figure 10:
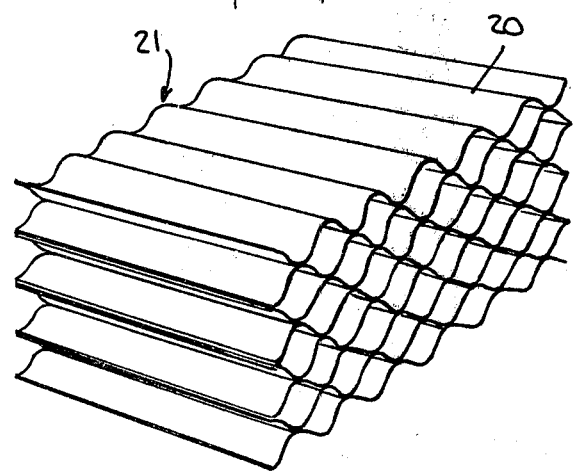
Figure 11:
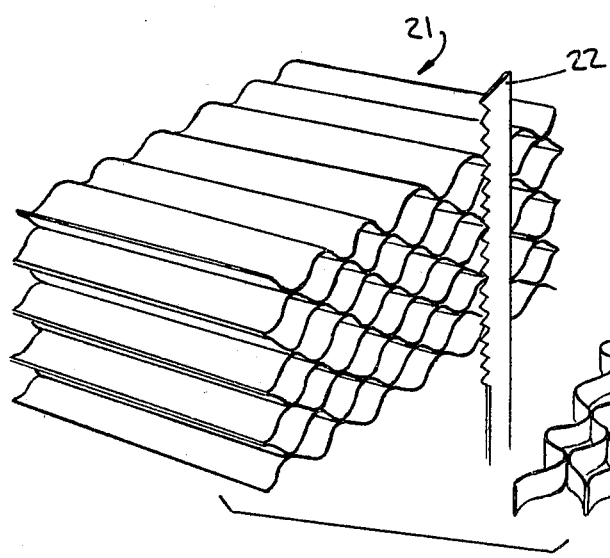
Figure 11:
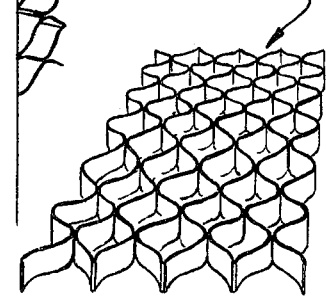

Corrugated veneers 20 are then stacked, as shown in FIG. 10, in out-of-phase relation and the troughs of one veneer are bonded to the peaks of the adjacent veneer to create a block 21. This block, as shown in FIG. 11, is then sawed with a bandsaw 22 into individual expanded cores 23.

In a veneer, the grain is flat. But if the flat-grain direction of the veneers in block 21 is transverse to the rectangular sheet, then the strips in the core produced by sawing the block wall will be end-grain.

It has been determined that by expanding a wood core of balsa or other wood in the manner described hereinabove, one can effect a substantial reduction in weight as great as 80% with a much smaller reduction in structural properties.

While there have been shown and described preferred embodiments of a structural laminate with expanded wood core in accordance with the invention, it will be appreciated that many changes and modifications may be made therein without, however, departing from the essential spirit thereof.

For example, the cells of the expanded core may be filled with a foam plastic material whereby the resultant laminate also functions as thermal insulation.

I claim:

1. A structural sandwich constituted by a core of expanded wood whose faces have skins laminated thereto, said core comprising an array of wood strips die cut from a block of end grain balsa wood and having a periodic wave formation, the upper and lower edges of the strips being bonded to the skins whereby the substantially parallel fibers of the balsa wood are normal to the skins to resist compressive forces, the wavy strips in the array being out of phase with each other and being bonded together at their abutting troughs and peaks to define open-ended cells, whereby the laminate is light in weight and of high strength.

2. A structure as set forth in claim 1 wherein said skins are formed of fiber-reinforced plastic sheets.

3. A structure as set forth in claim 1 wherein said periodic wave formation is sinusoidal to produce eye-shaped cells.

4. A structure as set forth in claim 1 wherein said cells are filled with foam plastic material.

5. A structure as set forth in claim 1, wherein said wave formation is such as to create cells having a polygonal shape.

6. A structure as set forth in claim 1, wherein said skins are of steel.

7. A structure as set forth in claim 1, wherein said skins are of aluminum.

* * * * *